Patented June 6, 1939

2,161,511

UNITED STATES PATENT OFFICE 2,161,511

PRODUCTION OF SURROGATES AND ADDITIONS FOR COFFEE

Eligius Freudl, Tetschen, Czechoslovakia, assignor to Coffarom Aktiengesellschaft, Glarus, Switzerland No Drawing. Application January 12, 1938, Serial No. 184,697. In Czechoslovakia January 23, 1937

8 Claims. (Cl. 99—74)

This invention relates to the production of surrogates and additions for coffee.

For producing surrogates and additions for coffee, it has already been proposed to employ as suitable raw materials, for example, roots or parts of the root of various genera of plants, such as bulbs of topinamber and dahlia, roots of chicory and viper's grass. These distinguish from most other raw materials by their percentage of inulin and substances similar to inulin, and, in some cases, have a peculiar characteristic bitter taste, even after having been worked into surrogates or additions for coffee, in a usual manner. This characteristic taste is undesirable, as it is a drawback to efforts to promote the more general use of the surrogates or additions for coffee produced from the above-mentioned raw materials.

The operation of working the raw materials concerned into surrogates and additions for coffee by means of the conventional drying and roasting processes results in an extensive pyrogenetic decomposition of the constituents contained in the bulbs and roots by influence of heat, whilst considerable amounts of pigments, assamar and various stimulants are formed, whereas valuable constituents tending to increase the stimulative effect go to waste by being either decomposed or rendered insoluble.

The object of the present invention is to provide an improved working process by means of which the characteristic bitter taste of the raw materials used, which hitherto penetrated through the product of roasting, can be reduced to any desired extent, completely eliminated, or even changed to a sweetish taste depending upon the manner in which the method is carried out, whereby a product of a highly stimulative effect is obtained which has an appreciable coloring capacity and an agreeable flavor.

In the process according to this invention the inulin and substances similar to inulin, as contained in the raw materials used, are hydrolysed on an industrial scale and the products of the hydrolysis, particularly the levulose, are utilized for producing melanoidin, that is, caramel, and thus for producing pigments from albumin decomposition products and sugars.

In the process according to this invention, the inulin and substances similar to inulin are hydrolysed by subjecting the raw materials to heat treatment in moist condition and their moisture content is maintained. During this heat treatment in moist condition the changing of the characteristic taste as alluded to above, that is, the removal of the bitter taste from the surrogate or addition materials for coffee, previously referred to, takes place. At the same time a relatively great amount of pigment material is already produced below the roasting temperatures since, owing to the presence of a plenteous quantity of levulose, thus of a sugar having a free carbonyl-group, the most favorable conditions for the formation of melanoidin and thus for the formation of caramel are given.

The formation of pigment material takes place at temperatures substantially lower than are usually resuired for the roasting process. The formation of pigment sets in at temperatures of about 100° C., whereas, as is well known, in the usual roasting process vigorous reaction sets in only at temperatures above 160° C., so that the undesirable transformations, which are a direct consequence of the elevated roasting temperatures, are avoided and, apart from this, the yield is increased.

The removal of the bitter taste as obtained, for example, for chicory may be due to the fact that the bitter substances of glucoside-like nature which oftentimes go with the inulin are partially destroyed by the heat treatment in moist condition or their effect is decreased, so that the product finally obtained is refined by the taste of the bitter substances being improved.

The intensity of the heat treatment in moist condition, if required, can be so increased, by conjoint action of pressure, that the inulin is sufficiently decomposed, that is, the decomposition is continued until the inulin is at least partly transformed into levulose, by which means separate roasting of the material may under certain circumstances be dispensed with.

These features distinguish the process according to the invention from known processes in which inulin-containing raw materials suitable for the production of surrogates and additions for coffee are steamed for removing the bitter substances prior to the roasting and are then extracted by means of boiling water, and also distinguish from known processes in which roasted granular inulin-containing raw materials, for the purpose of being powdered with chicory dust, are made sticky by means of steam or water, in order to provide the necessary adhesion for the powder to remain in place, particularly, while the material is subsequently dried, and finally roasted.

The application of the process according to the invention results in changing the taste of the material, that is, in improving it to any desired extent, and in browning the material, which coloring effect is different from that produced on the products of roasting by the conventional roasting processes, but is due, for the most part, to the heat treatment in the presence of moisture in consequence of which decomposition products are obtained which differ from those resulting from the roasting in dry condition, particularly, as regards the chemical structure.

In general, the process according to the invention is carried out by conjoint application of pressure and steam, for example, under a superatmospheric pressure of about 1 atm. for about 120 min., while the raw material to be treated, which may have a moisture content of approximately 10%, is heated. An excess of water is avoided as much as possible with a view to avoiding unnecessary expense for the subsequent drying.

In case it is required that a product be obtained having a particularly high coloring capacity of the surrogates or additions for coffee produced by means of the present process, whilst the stimulative and aromatic substances as obtained by application of the usual roasting processes are not to be wholly destroyed, such a process may obviously be applied to the product in a manner known per se, while it is dried.

Experience has shown that the temperature of the treatment can be lowered, or the duration of the same can be reduced, when, in carrying out the process according to the invention, appropriate catalysers are applied. As catalysers for this purpose, particularly, acidific substances, such as tartaric and citric acid, or salts with acid reaction, for example, primary phosphates and the like are suitable. Naturally, the application of an atmosphere of carbon dioxide brings about the same result.

Further, fermentative processes, particularly enzymatic processes may be utilised for facilitating the decomposition, for example, by adding extracts from fresh bulbs of dahlia or topinamber containing inulase.

It has also already been proposed to transform the inulin contained in the raw materials for the production of coffee surrogates into sugar in a purely biological way. However, this does not lead to the desired end.

The raw materials to which the process according to the invention is applied need not be in fresh state, but may be subjected to the treatment after having been brought into a condition suitable for being stored for later use, for example, in dry or slightly roasted condition. Such a preliminary roasting has proved to be adequate in many cases.

It is immaterial in what physical condition the materials concerned are subjected to the treatment. It may be in the form of slices, lumps, chips or the like.

*Examples*

(I) 50 kilograms of raw material, particularly chicory roots, are heated in a pressure vessel together with 5 litres of water, or while a corresponding amount of steam is introduced, under a steam pressure of about 1 atm. for a period of 2 hours. Thereupon the material is dried in usual manner, and, if desired, roasted and ground.

(II) 50 kilograms of raw material are dampened with 10 litres of an extract from fresh bulbs of dahlia or topinamber, then slowly heated to about 60° C. and maintained at this temperature for approximately 12 to 36 hours. Thereupon the material is dried, and, if desired, roasted and ground.

By properly controlling the process according to the invention, it can be applied for treating, for example, chicory in such an extensive manner that the characteristic bitter taste of the beverage made therefrom is completely eliminated and a product of an entirely original taste similar to that of coffee is obtained.

Admittedly, the application of heat in presence of moisture for decomposing the raw materials, for the production of surrogates for coffee is a matter known per se, but, as a matter of fact, this measure has hitherto been employed only in specific working methods for the treatment of cereals and leguminose seeds. The composition of the farinaceous substances treated by said known working processes being however different from that of the substances with which this invention is concerned, the results obtained by means of said known processes differ from the results herein disclosed. Furthermore, the materials subjected to a heat treatment in presence of moisture according to said known decomposing processes must, in all cases, be after-treated by a roasting process, in order to obtain a product which deserves to be classified with surrogates or additions for coffee.

Also processes have been hitherto proposed for the production of diabetic nourishment from inulin-containing vegetable substances. However, these known processes have for their object the production of levulose preparations for use as sugar for diabetic nutrition and do not operate similarly to the present process.

Various changes and modifications may be made in the practice of my invention without departing from the principle or spirit thereof, by adding customary practice and established knowledge of the art to the present disclosure and the scope of the appended claims is not to be regarded as limited except as specified therein.

What I claim is:

1. In a process of treating raw material containing inulin, such as bulbs of topinamber and dahlia, and roots of chicory and viper's grass, the steps comprising hydrolizing the inulin by heating the raw material in the presence of moisture, and converting the hydrolized inulin to melanoidin or caramel by continuing the heating.

2. In a process of treating raw material containing inulin, such as bulbs of topinamber and dahlia, and roots of chicory and viper's grass, the steps comprising hydrolizing the inulin by heating the raw material in the presence of moisture and under pressure, and converting the hydrolized inulin to melanoidin or caramel by continuing the heating.

3. In a process of treating raw material containing inulin, such as bulbs of topinamber and dahlia, and roots of chicory and viper's grass, the steps comprising hydrolyzing the inulin by heating the raw material in the presence of moisture and with a catalyst of the group consisting of dilute acid and enzymes, and converting the hydrolized inulin to melanoidin or caramel by continuing the heating.

4. In a process of treating raw material containing inulin, such as bulbs of topinamber and dahlia, and roots of chicory and viper's grass, the steps comprising hydrolizing the inulin by heating the raw material in the presence of moisture and under pressure and in the presence of dilute acid as a catalyst, and converting the hydrolized inulin to melanoidin or caramel by continuing the heating.

5. In a process of treating raw material containing inulin, such as bulbs of topinamber and dahlia, and roots of chicory and viper's grass, the steps comprising hydrolizing the inulin by heating the raw material in the presence of moisture and in the presence of an enzymatic catalyst, and converting the hydrolized inulin to melanoidin or caramel by continuing the heating.

6. In a process of treating raw material containing inulin, such as bulbs of topinamber and dahlia, and roots of chicory and viper's grass, the steps comprising hydrolizing the inulin by heating the raw material in the presence of moisture and under pressure, converting the hydrolized inulin to melanoidin or caramel by continuing the heating, and then drying and roasting the material.

7. In a process of treating raw material containing inulin, such as bulbs of topinamber and dahlia, and roots of chicory and viper's grass, the steps comprising preliminarily partially roasting the inulin-containing raw material to prepare it for being hydrolized, hydrolizing the inulin by heating the raw material in the presence of moisture, and converting the hydrolized inulin to melanoidin or caramel by continuing the heating.

8. In a process of treating raw material containing inulin, such as bulbs of topinamber and dahlia, and roots of chicory and viper's grass, the steps comprising preliminarily partially roasting the inulin-containing raw material to prepare it for being hydrolized, hydrolizing the inulin by heating the raw material in the presence of moisture and under pressure, and converting the hydrolized inulin to melanoidin or caramel by continuing the heating.

ELIGIUS FREUDL.